United States Patent
May et al.

(10) Patent No.: US 7,604,357 B2
(45) Date of Patent: *Oct. 20, 2009

(54) ADJUSTING LIGHT INTENSITY

(75) Inventors: Gregory J. May, Corvallis, OR (US);
William J. Allen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 374 days.

This patent is subject to a terminal disclaimer.

(21) Appl. No.: 11/247,650

(22) Filed: Oct. 11, 2005

(65) Prior Publication Data

US 2007/0081130 A1    Apr. 12, 2007

(51) Int. Cl.
G03B 21/20    (2006.01)
G03B 21/60    (2006.01)
G09G 5/02    (2006.01)
G09G 5/10    (2006.01)
G09G 3/30    (2006.01)
G09G 3/34    (2006.01)

(52) U.S. Cl. .................. 353/85; 345/589; 345/690; 345/77; 345/84; 359/459

(58) Field of Classification Search ............ 353/85, 353/87; 345/30, 589, 690, 12, 20, 63, 77, 345/84; 348/673, 687; 359/454, 459
See application file for complete search history.

(56) References Cited

U.S. PATENT DOCUMENTS

| | | | |
|---|---|---|---|
| 6,481,851 | B1 | 11/2002 | McNelley et al. |
| 6,538,814 | B2 | 3/2003 | Hunter et al. |
| 6,572,232 | B2 | 6/2003 | Yaniv |
| 6,726,335 | B2 | 4/2004 | Yaniv et al. |
| 6,853,486 | B2 | 2/2005 | Cruz-Uribe et al. |
| 2004/0012849 | A1* | 1/2004 | Cruz-Uribe et al. ......... 359/449 |
| 2004/0095558 | A1 | 5/2004 | Whitehead et al. |
| 2006/0268180 | A1* | 11/2006 | Chou .................. 348/673 |
| 2006/0279477 | A1* | 12/2006 | Allen et al. .............. 345/30 |

* cited by examiner

Primary Examiner—Rochelle-Ann J Blackman

(57) ABSTRACT

Embodiments of adjusting light intensity are disclosed.

22 Claims, 8 Drawing Sheets

ADJUSTING LIGHT INTENSITY

BACKGROUND

Projection systems are regarded as a cost effective way of providing very large array displays for a relatively low cost. Such systems, however, suffer from ambient light interference for all but the darkest rooms. This difficulty can be especially prominent for darker images.

DETAILED DESCRIPTION

Figure 1:
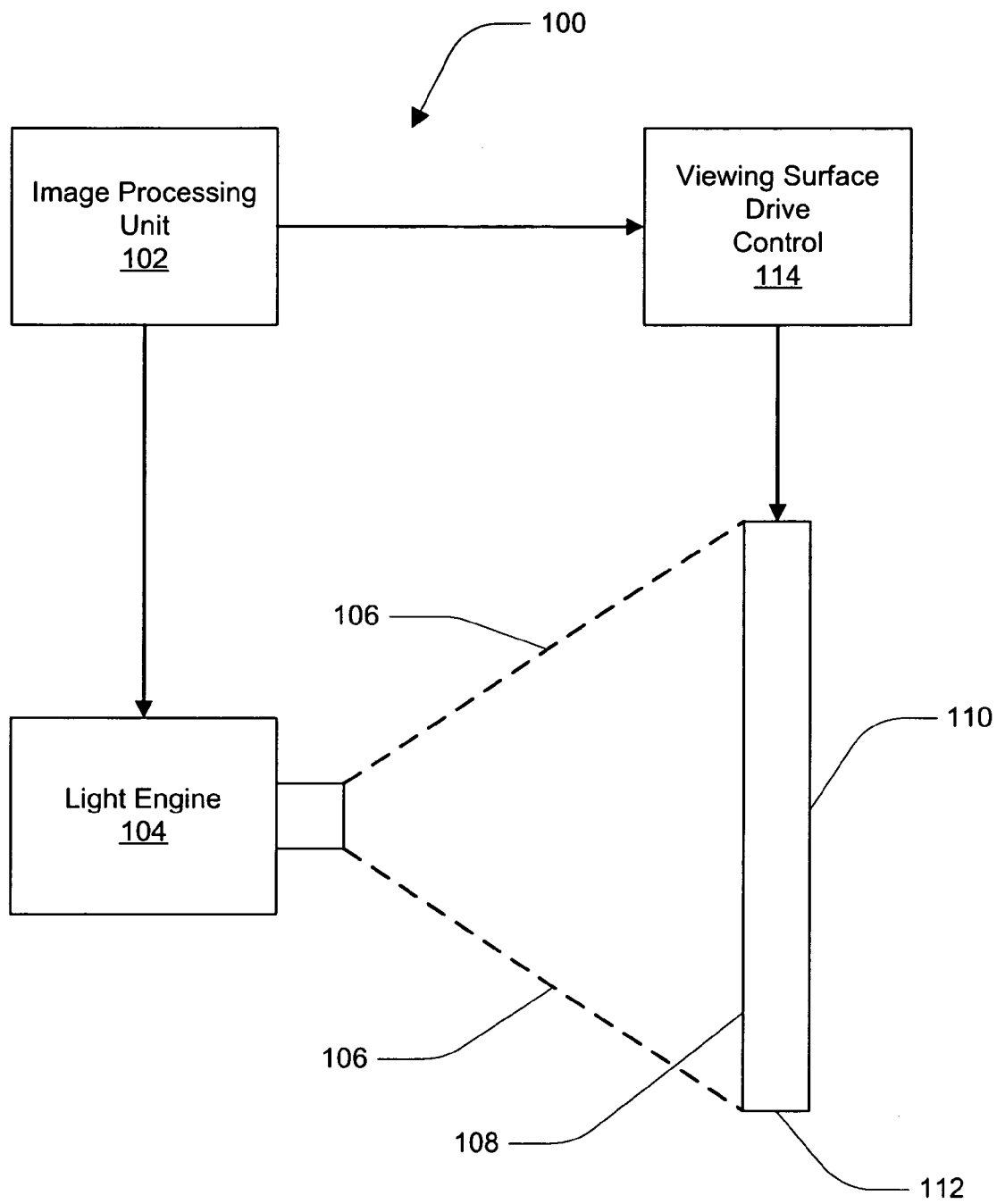
FIG. 1 is a schematic of an embodiment of a projection system in accordance with one embodiment of the disclosure.

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, electrical or mechanical changes may be made without departing from the scope of the present disclosure. The following detailed description is, therefore, not to be taken in a limiting sense, and the scope of the present disclosure is defined by the appended claims and equivalents thereof.

An apparatus in accordance with one embodiment includes a light engine to project light having discrete ON/OFF states and a processing unit configured to cause the light engine to adjust a number of ON states during a given time period according to expected states for the elements and a desired relative luminance during the time period. For embodiments of the present disclosure, the viewing surface is of a type capable of varying its reflectivity (in the case of front projection systems) or transmissivity (in the case of rear projection systems) in at least one element. For certain embodiments, the viewing surface is capable of varying the reflectivity or transmissivity of various components of the light spectrum independent of other components of the light spectrum. For example, a band in the red spectrum may be reflected or transmitted independently of a band in the blue spectrum. For other embodiments, reflectivity or transmissivity may be varied across the visible spectrum more or less equally across the spectrum. For embodiments of the present disclosure, the light modulation function is split between the light engine and the viewing surface. For one embodiment, upon receiving input image data, the processing unit sends a first set of signals to control the light engine and a second set of signals to control the viewing surface. This system can operate in open loop, e.g., data sent to the projector and data sent to the screen are independent, or closed loop, e.g., feedback information, such as alignment and timing information, is obtained and used to adjust the projector.

In response to receiving an incoming video signal, the processing unit determines a desired reflectivity or transmissivity for the viewing surface. Determination of desired reflectivity or transmissivity may be made by analysis of individual color and/or the luminance components of the image data. The determination of desired reflectivity or transmissivity may further be determined taking into account temporal aspects of the projection of a single frame of image data and/or temporal aspects of projection of a sequence of image frames. For example, determination of desired reflectivity or transmissivity may be determined over a time period containing a number of scenes, on a scene-by-scene basis, on a frame-by-frame basis or on a color sub-field-by-color sub-field basis. Note that the desired reflectivity or transmissivity for an element can be some value greater than what would be used to produce a desired relative luminance of the output image at a highest output intensity of the embodiment of the light engine used. For some embodiments, the desired reflectivity or transmissivity is the lowest value within the capability of the viewing surface that is still capable of producing the desired relative luminance of the output image.

Regardless of whether front projection or rear projection is used, some form of light engine is utilized to generate rays of light to be reflected from a viewing surface associated with a display, or transmitted through a viewing surface, respectively. One type of light engine utilizes a light source, a color wheel and a spatial light modulator. Such light engines produce color in a manner typically referred to as "field sequential color." Light generated from the light source is directed onto the color wheel, which sequentially filters light from the light source. The color wheel typically generates a sequence of primary colors of light: red, green and blue, and, in some embodiments, may also generate white light in sequence. The red, green, white and blue colors of light are sequentially sent to the spatial light modulator, which spatially modulates the colored light depending on the image data by controlling the intensity of each color of light at individual positions in the projected image. The modulated color sub-fields are projected in a sequence at a rapid rate onto a viewing surface, and the human eye integrates the sequences of color sub-fields and a continuous image that is perceived to be flicker-free can be projected.

For such systems, projected intensity and color for a given location in the output image is determined by its modulation, i.e., an amount of light the spatial modulator allows to be delivered to the viewing surface at that location for each of the colors in the sequence. Some light modulators, such as digital micro-mirror (DMD) devices manufactured by Texas Instruments modulate light intensity in the time domain. Tiny micro-mirrors, typically one for each output image pixel, oscillate and alternatively direct light onto the screen at each pixel position or direct the light into a trap or absorber. The intensity of projected light corresponds to the duty cycle of the mirrors. In field sequential systems, mirrors on a single light modulator independently modulate intensity of each pixel in each color sub-field. It is noted that light engines sometimes block light with the spatial modulator during the entire time period during which each color filter is between the light source and the spatial modulator in order to facilitate better separation of colors by blocking projection of light during transition from one filter segment to the next.

Other systems may employ an array of light emitting diodes (LEDs), or lasers capable of scanning rays of light across the viewing surface, as their light engine. In a similar manner, hue, colorfulness and brightness are generally controlled by modulating the amount of power delivered of each primary color to a spot on the viewing surface corresponding to a location in the output image.

Embodiments will be described in the context of digital projectors using DMD devices, but the disclosure is applicable to other light modulation techniques as will be appreciated upon reading the disclosure. In DMD projectors, a digital signal activates an electrode beneath each mirror, thereby tilting the mirror toward or away from a light source. Tilted toward the light (ON), the mirror reflects a pixel into the projection lens and onto the screen. Tilted away from the light, (OFF) the mirror directs light away from the projection lens and the pixel's location on the screen does not illuminate. The DMD mirrors can generally switch on and off thousands of times every second. By varying the on and off time of each mirror, different intensity levels can be created in an image. A greater percentage of ON time creates a lighter pixel (more intense pixel), while a greater percentage of OFF time creates a darker pixel (less intense pixel). Color can be created by placing a rotating color filter wheel between the lamp and the mirror panel. As the color wheel spins, it causes a sequence of red, green, and blue (and sometimes white, depending upon the color wheel) light to fall on the DMD mirrors. The ON states and OFF states of each mirror are coordinated with these intervals of colored light and a sequence of colored images is produced on a projection screen. If the color sequence is displayed rapidly, the eye perceives a flicker-free full color image.

Images produced by DMD projection systems often contain an artifact, perceived as snow or sizzle, in the darker areas. Such snow is the result of the physical limit to the unit of time it takes for the mirrors of the DMD mirror array to switch on and then switch off. The smallest single increment of light energy that can be metered out by the DMD is influenced by factors such as the smallest amount of time a mirror can be in the ON position for the particular embodiment of the DMD used and the corresponding intensity of light through the system. If a single of these smallest pulses of light is detectable by the eye, and the pixels on the spatial light modulator are not operating uniformly (e.g., when spatial dithering is employed), a snow-like artifact is imposed on the output image. In one example, the mirrors are capable of flipping on and off in ½0th the duration of the period of each color segment of a rotating color wheel. Therefore, to achieve the highest luminance of a particular color for the embodiment of the system used, say red, the mirror is placed in the ON state during the entire period of time it takes to progress through the red segment of the rotating color wheel, and the highest luminance attainable for red is considered 20 steps or ON states, assuming a light source output of at least substantially constant intensity. For darker colors, such as video scenes featuring black or very dark color portions, a much lower luminance is desired in that region of the screen and therefore the mirrors associated with those pixels are flipped to their ON state for the lowest number of ON times achievable, such as zero, one, or two during the filter segment period for the particular embodiment of the DMD used, such that very few or no increments of light are sent to the appropriate pixels. Often times, the desired intensity of the very dark color that is being reproduced is somewhere in between an integral number of the increments of light that can be metered out by the spatial light modulator. Sometimes temporal dithering techniques are used and an intensity corresponding to a non-integral number of increments is achieved by repeatedly switching during operation of the system between zero and one or between one or two ON times every time a particular color of filter comes around on the wheel. If the eye can perceive the difference in intensity produced by these different number of ON-times per color sub-frame (occurring during a time corresponding to the time of a color segment), the viewer perceives an artifact in the dark image called snow. This effect is generally unperceivable or at least difficult to perceive in high brightness areas of images, as the eye is less sensitive to incremental intensity or brightness changes at higher intensities, but the effect is especially a concern for image quality and eye strain when viewing images with dark areas. While incorporating a faster switching scheme into a digital projector and keeping the color segment times substantially constant, for example, reduces the smallest ON time achievable and can provide finer intensity adjustments, hereafter referred to as increased bit depth, the DMD array is usually the most costly element of a digital projector and hence such a change to the DMD does not prove a cost effective system solution.

In various embodiments, the viewing surface is modulated in coordination with the light projected from the light engine to produce the desired image while increasing the bit depth available in producing the resulting image without using a light engine having enhanced capabilities.

FIG. 1 is a schematic of an embodiment of a projection system 100 in accordance with one embodiment of the present disclosure. The projection system 100 includes an image processing unit 102 for control and coordination of the shared light modulation between the light engine 104 and the display screen 112. The image processing unit 102 receives incoming image data and provides control signals for the light engine 104 and, in some embodiments, also provides signals for the viewing surface drive control 114 for modulation of the viewing surface 108 of screen 112.

The light engine 104 generally defines spots of light on the screen 112 by projecting rays of light, represented generally by dashed lines 106, onto viewing surface 108 of screen 112. The rays of light 106 generally are in either a fixed matrix pattern or are scanned across the viewing surface and are modulated in response to control signals received from the image processing unit 102. For a front-projection system, an image is viewable as light reflected from the viewing surface 108 of screen 112. For a rear-projection system, an image is viewable as light transmitted through screen 112 to viewing surface 110.

The screen 112 may include an array of screen elements (not shown in FIG. 1) that are controllable to be in an ON or white state (the highest degree of reflectivity that can generally be obtained for the embodiment of screen 112 used for front projection or the highest degree of transmissivity that can be obtained for the embodiment of screen 112 used for rear projection) or an OFF or black state (the highest degree of non-reflectivity that can be obtained for the embodiment of screen 112 used for front projection or the highest degree of non-transmissivity that can be obtained for the embodiment of screen 112 for rear projection). For another embodiment, the ON state may refer to the highest degree of reflectivity or transmissivity for a spectral range or combination of spectral ranges while the OFF state may refer to the highest degree of non-reflectivity or non-transmissivity for the spectral range or the combination of spectral ranges. For example, in a front-projection system while red light is being projected, the ON state could refer to a state of the screen element having the highest reflectivity for red light and the OFF state could refer to a state of the screen element having the highest absorption of red light, noting that each color of light may have its own corresponding set of states. Similarly, if multiple colors of light or spectral ranges are projected simultaneously on a screen element, the ON state could refer to a state of the screen element having the highest reflectivity for that combination of spectral ranges and the OFF state could refer to a state of the screen element having the highest absorption of that combination of spectral ranges. Viewing surface drive control 114 controls the modulation of the elements in response to control signals from the image processing unit 102. Note that while this embodiment is described with the image processing unit 102 controlling both the light engine 104 and the viewing surface drive control 114, the screen 112 could have its own image processing unit (not shown) for control of the viewing surface drive control 114 in response to image data independent of the image processing unit 102. While the various embodiments have been generally described in reference to the binary ON states and OFF states of the elements for simplicity, it is noted that the various embodiments may also utilize elements capable of varying their states on a continuum between the ON states and OFF states. For purposes of this disclosure, the term "continuum" may refer to a continuous analog variation between the ON states and OFF states, or it may refer to discrete finite number of one or more states between the ON and OFF states. It is further noted that the term "element" relates to an addressable portion of the screen 112 and may not correspond to a discrete device.

Figure 2A:
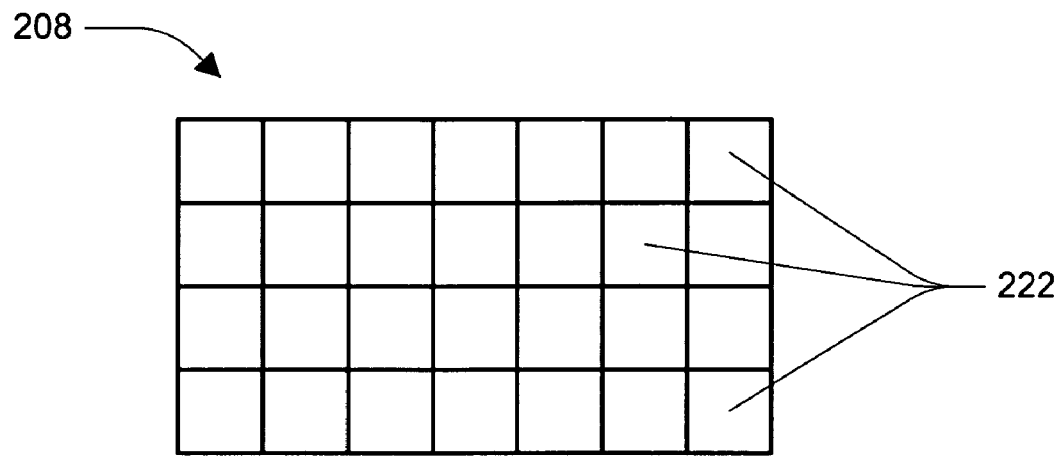
FIGS. 2A-2B are schematics of zones for projecting an image in accordance with embodiments of the disclosure.
Figure 2B:
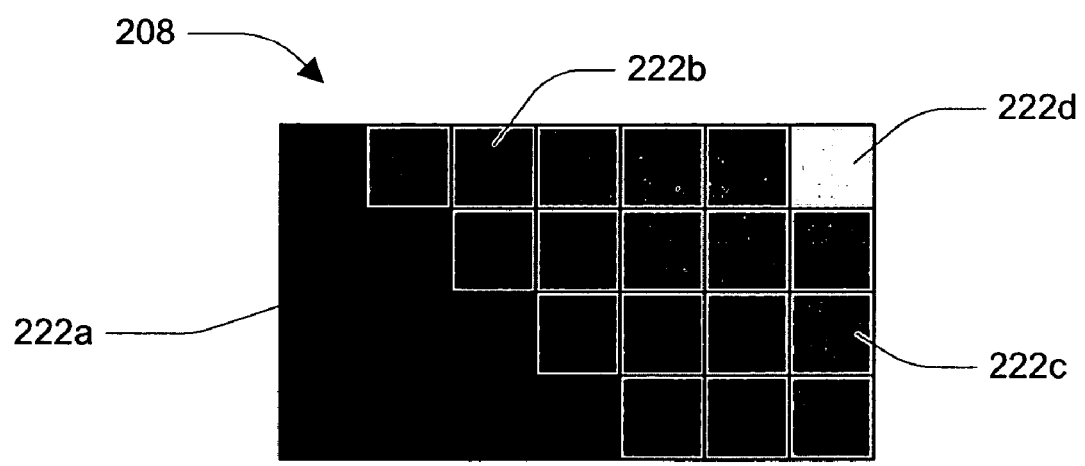

FIGS. 2A-2B are schematics of an embodiment of a portion of a viewing surface 208 for displaying an image in accordance with one embodiment of the disclosure. The viewing surface 208 includes one or more elements 222 capable of changing states of reflectivity or transmissivity. While the remainder of this disclosure will generally discuss the embodiments in terms of a front projection system, it will be understood that the concepts of the disclosure are equally applicable to rear projection systems by replacing references to reflectivity of the viewing surface to references to transmissivity of the viewing surface.

Each of the elements 222 may be independently controlled for reflectivity or sets of the elements 222 may respond concurrently as a single super element. Reflectivity of the elements 222 may be controlled responsive to the image data received by the image processing unit, and further may be controlled responsive to user input and viewing conditions. Changing the reflectivity of the viewing surface may be more effective than dimming the light leaving the projector with regard to achieving a desired image quality perception. Screens respond to ambient light in the same manner as projection light. So, as a screen is lit by the ambient light then the darkest portions of the scene are lightened, or washed out, by the ambient light. The contrast ratio of the highest luminance level in the image (including ambient light) to the lowest luminance level in the image (including ambient light), of the projected image is thus diminished. Therefore, by reducing the reflectivity of the screen, it also reduces the effects of the ambient light on the screen. The largest changes are seen in the darker parts of the image, were reduced reflection of ambient light significantly contributes to the ability to reproduce lower luminance levels. Human perception of image quality is enhanced by providing a strong black in the image.

Suppose a particular spot on the screen, corresponding to a single pixel on the spatial light modulator, is supposed to be reproduced to provide 5% of the highest luminance possible by the embodiment of the projector/screen system used. To reach this highest luminance level, the reflectivity of the screen element on which the pixel is imaged is set to the highest achievable level for the embodiment of the screen used, and so is the projected light output for that pixel. Suppose there are p units of luminance provided by the projected light reflected from the screen in this highest luminance situation. Further suppose the ambient light contributes 0.1 of p units of luminance to all parts of the image projected onto the screen. Luminance contributions from various sources are additive. Even if the projector can switch a pixel completely off, the corresponding location on the screen will have 0.1 of p units of luminance due to the contribution of the ambient light. In this case, it is not possible to correctly reproduce the spot of the image on the screen having 5% of the highest luminance, because the contribution of ambient light would produce 10% of the highest luminance even if the projector's contribution were zero. But suppose the element of the screen corresponding to the pixel in question could be adjusted to reflect 25% as much light as it reflects in the ON state. Then the ambient light contribution to luminance of the image is reduced by a factor of 4, and it is now 0.025 of p.

Starting with the desired luminance from an area on the screen of 0.1 of p, and subtracting the ambient contribution (the 0.1 of p reduced by a factor of 4 as a result of the reduced screen reflectivity), we have a remaining required contribution from the projector of 0.075 of p units so that the desired luminance of 0.1 of p from the area of the screen would be achieved. The projector's contribution is also reduced by a factor of 4, so in this case its output would be set to 0.075*4 of its highest level=0.3 of its highest level=30% of the highest output of the projector of the example embodiment. Final luminance is (0.3 of p+0.1 of p)/4=0.1 of p, the desired value. The pixel is reproduced correctly due to the increased dynamic range of the projector/screen system and cooperation between the projector and the screen in modulating the amount of light delivered to the viewer. The projector does not modulate ambient light in this example, but the screen can modulate both ambient light and image light.

In FIG. 2A, surface 208 is depicted to have an array of elements 222. Elements 222 are generally the individual elements of the viewing surface and represent the smallest areas of individually variable resolution of the viewing surface. In some embodiments, the viewing surface may have a higher resolution, i.e., more than one element per projected pixel, than its corresponding light engine.

In FIG. 2B, an example of a desired image is shown with one or more first pixels 222a having a first brightness, one or more second pixels 222b having a second brightness, one or more third pixels 222c having a third brightness and one or more fourth pixels 222d having a fourth brightness, with the different "brightness" values for the groups of pixels referring to the different luminance levels of the light reflected from the pixels. For a light engine having the capability to switch at a rate sufficient to provide 20 discrete ON state intervals per color sub-frame and projecting onto a surface having a fixed reflectivity, the first pixels 222a may correspond to regions of the image having desired luminance reproduction values that are greater than a produced luminance value corresponding to 0 ON states per color sub-frame and less than a produced luminance value corresponding to 1 ON state per color sub-frame; the second pixels 222b may correspond to regions of the image having desired luminance reproduction values that are greater than a produced luminance value corresponding to 5 ON states per color sub-frame and less than a produced luminance value corresponding to 6 ON states per color sub-frame; the third pixels 222c may correspond to regions of the image having desired luminance reproduction values that are greater than a produced luminance value corresponding to 10 ON states per color sub-frame and less than a produced luminance value corresponding to 11 ON states per color sub-frame; and the fourth pixels 222c may correspond to regions of the image having desired luminance reproduction values that are greater than a produced luminance value corresponding to 15 ON states per color sub-frame and less than a produced luminance value corresponding to 16 ON states per color sub-frame. While the perception of luminance values between those values corresponding to discrete values of ON states can be attained by cycling temporally between the attainable discrete values, it has been noted that snow can appear at lower luminance levels such as might be found when producing the first pixels 222a on a system having a screen of fixed reflectivity. The various embodiments facilitate a closer approximation of desired relative luminance, facilitating a decreased occurrence of snow, by sharing the light modulation function with the viewing surface, thus reducing the visual step size between adjacent attainable discrete values of the projected images. For example, using a reflectivity level of 100% of a particular screen's highest potential reflectivity, the step size of reflected luminance between color sub-frames having a number of ON states per color sub-frame differing by one is 5% of the highest achievable luminance if the projector output was at its highest achievable intensity. However, using a reflectivity level of 40% of a screen's potential, the step size of reflected luminance between color sub-frames having a number of ON states per color sub-frame differing by one is now 2% of the luminance that would be obtained if the projector output was at its highest achievable intensity and the screen reflectivity was at 100% of a particular screen's highest potential reflectivity.

Figure 3A:
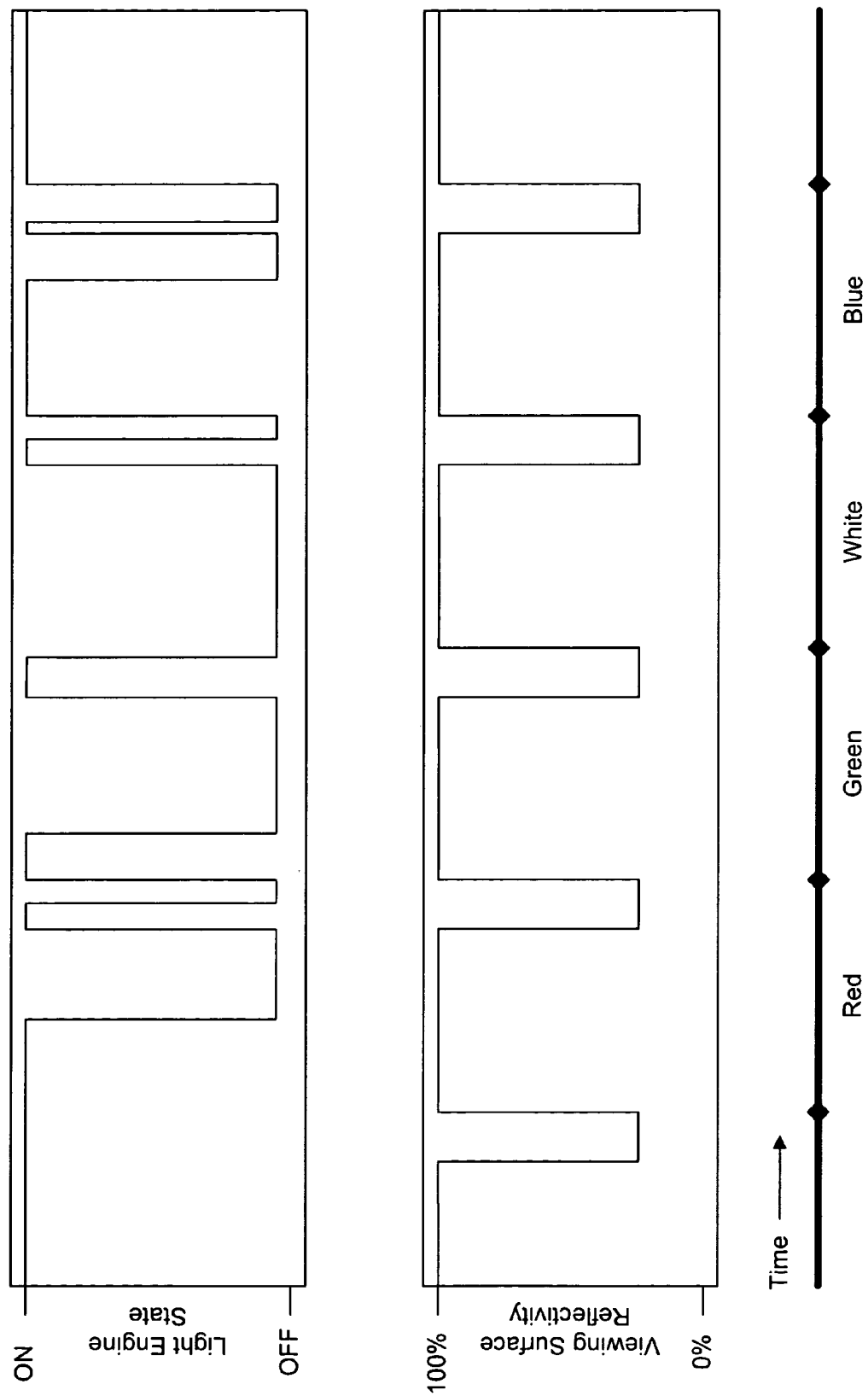
FIGS. 3A-3B are graphs depicting reflectivity of an embodiment of a viewing surface in relation to sequentially projected color sub-fields along with corresponding ON/OFF states of a light engine in accordance with various embodiments of the disclosure.
Figure 3B:
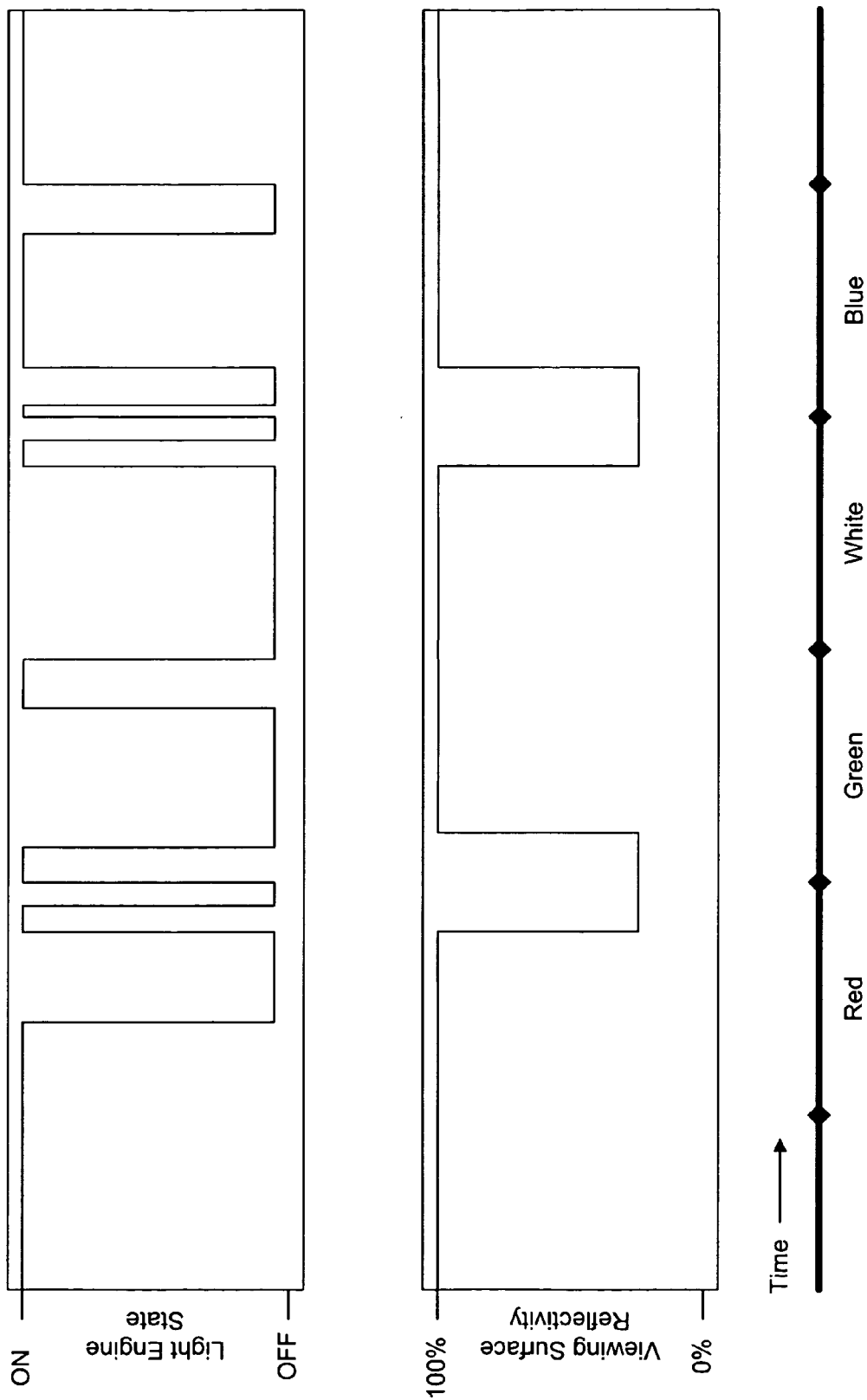

FIGS. 3A-3B are graphs depicting the reflectivity, over time, of an embodiment of a viewing surface in relation to sequentially projected color sub-fields in accordance with various embodiments of the disclosure along with corresponding ON/OFF states of a light engine showing how bit depth can be increased in accordance with the various embodiments. Note that the ON/OFF states of the light engine are represented conceptually as a number of ON/OFF states during their relevant time periods and that the figures do not imply that ON states occur during a first portion of a time period with OFF states occurring during a remaining portion of the time period for every embodiment. That is, various embodiments may make use of a wide variety of different locations and distributions of ON states and OFF states within the relevant time periods.

In FIG. 3A, for one embodiment of a projection system, the viewing surface reflectivity has a first state of 100% of its highest achievable reflectivity during a first time period and a second state of 25% of its highest achievable reflectivity during a second time period. Furthermore, the light modulator can be controlled between ON and OFF states. For example, as described above, the light modulator may be capable of providing 20 ON states during the time corresponding to each color segment. If the first time period where the viewing surface has its first state is 80% of the time for a color segment and the second time period where the viewing surface has its second state is 20% of the time for a color segment, such a light modulator could have a first number of possible ON states for the first time period, e.g., 80% of 20, or 16, and a second number of ON states for the second time period, e.g., 20% of 20, or 4. Thus, for the embodiment shown in FIG. 3A, the Red segment might correspond to 10 ON states, or 62.5% of the time, during the first time period and 2 ON states, or 50% of the time, during the second time period; the Green segment might correspond to 4 ON states, or 25% of the time, during the first time period and 3 ON states, or 75% of the time, during the second time period; the White segment might correspond to 0 ON states, or 0% of the time, during the first time period and 2 ON states, or 50% of the time, during the second time period; and the Blue segment might correspond to 12 ON states, of 75% of the time, during the first time period and 1 ON state, or 25% of the time, during the second time period. In this example, the Red segment would correspond to 10.50 ON states at 100% reflectivity, i.e., 10 ON states at 100% reflectivity and 2 ON states at 25% reflectivity provides substantially equivalent perceived luminance as 10.50 ON states at 100% reflectivity. In a similar manner, the Green segment would correspond to 4.75 ON states at 100% reflectivity, the White segment would correspond to 0.50 ON states at 100% reflectivity, and the Blue segment would correspond to 12.25 ON states at 100% reflectivity. It can be seen in this example that finer steps in perceived luminance can be achieved, thus increasing bit depth. Other numbers of ON/OFF states and other reflectivity levels can be used to obtain corresponding results in accordance with the guidance of the embodiments. Similarly, other values and numbers of states for the viewing surface reflectivity can also be used. The embodiment described with reference to FIG. 3A is just one example provided to demonstrate a concept of the disclosure. Additionally, although the example is described with reference to discrete ON/OFF states of the light engine, it will be apparent that substantially identical results can be obtained by reducing the projected intensity of the light source in an analog manner.

To reduce the number of transitions of viewing surface reflectivity, the last surface reflectivity value for a color sub-frame could be maintained as the first surface reflectivity value for a subsequent color sub-frame. FIG. 3B demonstrates how reduced transitioning could be used while attaining substantially the same viewer perceived results as described with reference to FIG. 3A. Thus, for the embodiment shown in FIG. 3B, the Red segment might correspond to 10 ON states during the first time period and 2 ON states during the second time period, the Green segment might correspond to 3 ON states during the first time period and 4 ON states during the second time period, the White segment might correspond to 0 ON states during the first time period and 2 ON states during the second time period, and the Blue segment might correspond to 1 ON state during the first time period and 12 ON state during the second time period, with the first time period corresponding to the first reflectivity level for the Red and White segments and to the second reflectivity level for the Green and Blue segments. As with the example of FIG. 3A, the Red segment would correspond to 10.50 ON states at 100% reflectivity, the Green segment would correspond to 4.75 ON states at 100% reflectivity, the White segment would correspond to 0.50 ON states at 100% reflectivity, and the Blue segment would correspond to 12.25 ON states at 100% reflectivity.

While the foregoing embodiments utilized the same set of reflectivity levels for each set of time periods, other embodiments may adjust reflectivity for each color segment or other time period. For example, continuing with the example of 20 possible ON states for each color segment, if a viewing surface has two or more reflectivity levels, e.g., 25%, 50%, 75% and 100%, a different reflectivity level could be used for different ranges of desired intensity, thereby facilitating a decreased step size between reflected luminance. In this manner, the 25% reflectivity level could be used for desired relative luminance values of 0-25% having step sizes of 1.25% (25%/20 ON states); the 50% reflectivity level could be used for desired relative luminance values of 0-50% having step sizes of 2.5%; the 75% reflectivity level could be used for desired relative luminance values of 0-75% having step sizes of 3.75%; and the 100% reflectivity level could be used for desired relative luminance values of 0-100% having step sizes of 5%. As noted earlier, intermediate values of relative luminance can be obtained by changing a number of ON states between frames. For example, using a 25% reflectivity level, 2 ON states for a first frame and 3 ON states for a second frame, a relative luminance value of 3.125% could be perceived, provided the time between frames is sufficient to permit integration by the viewer.

Figure 4:
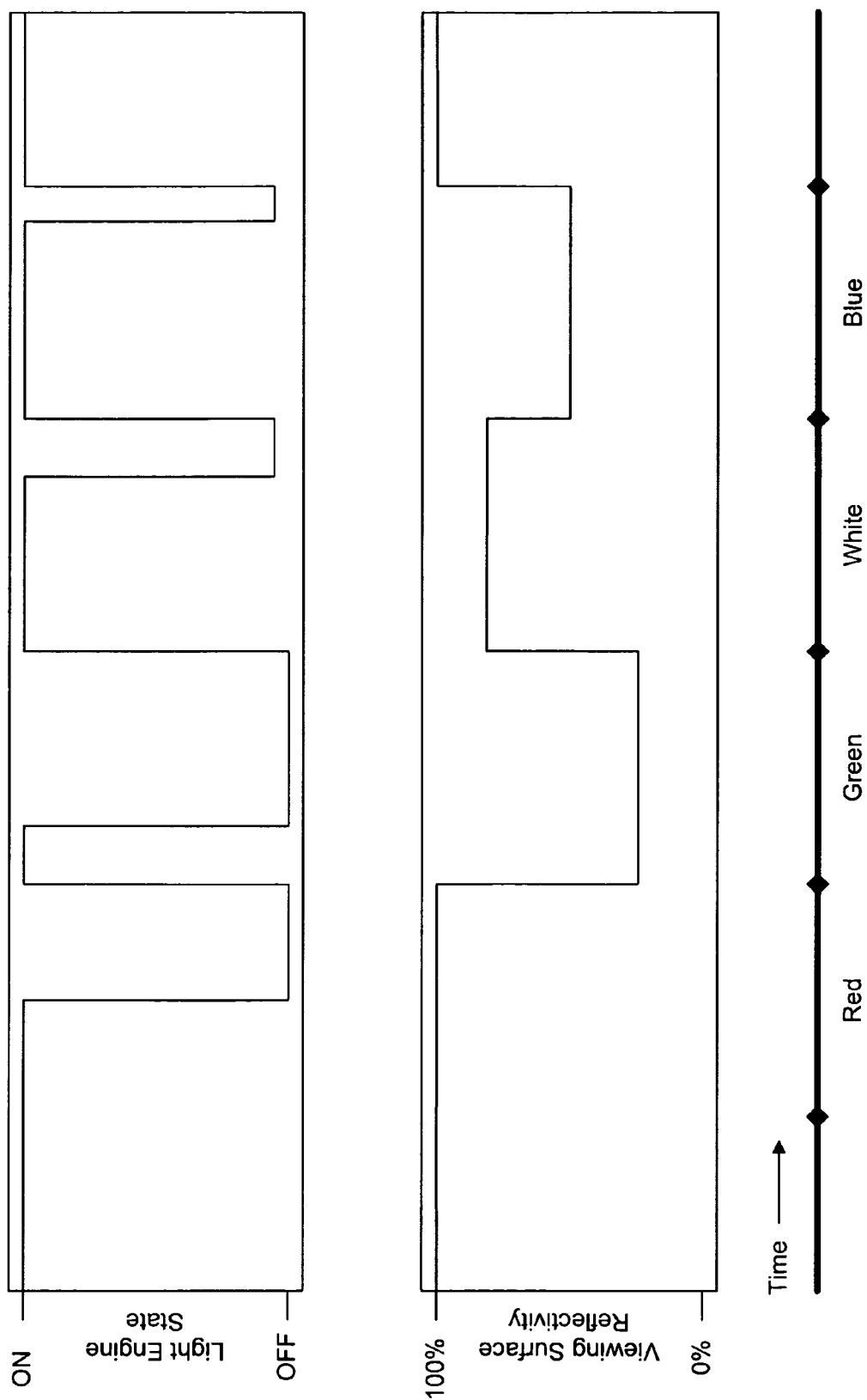
FIG. 4 is a graph depicting reflectivity of an embodiment of a viewing surface in relation to sequentially projected color sub-fields along with corresponding ON/OFF states of a light engine in accordance with further embodiments of the disclosure.

FIG. 4 is a graph depicting the reflectivity, over time, of an embodiment of a viewing surface in relation to sequentially projected color sub-fields in accordance with further embodiments of the disclosure along with corresponding ON/OFF states of a light engine showing how bit depth can be increased in accordance with the various embodiments. Note that the ON/OFF states of the light engine are represented conceptually as a number of ON/OFF states during their relevant time periods and that the figures do not imply that ON states occur during a first portion of a time period with OFF states occurring during a remaining portion of the time period for every embodiment. That is, various embodiments may make use of a wide variety of different locations and distributions of ON states and OFF states within the relevant time periods.

In FIG. 4, for one embodiment of a projection system, the viewing surface reflectivity has a reflectivity level of 100% of its highest achievable reflectivity, 75% of its highest achievable reflectivity, 50% of its highest achievable reflectivity or 25% of its highest achievable reflectivity during each color segment. As with earlier examples, the light modulator is assumed to allow control between some number of possible ON and OFF states, e.g., 20. Thus, for the embodiment shown in FIG. 4, the Red segment might correspond to 10 ON states along with a reflectivity level of 100%, the Green segment might correspond to 5 ON states along with a reflectivity level of 25%, the White segment might correspond to 15 ON states along with a reflectivity level of 75%, and the Blue segment might correspond to 17 ON states along with a reflectivity level of 50%. In this example, with respect to yielding substantially equivalent perceived luminance, the Red segment would correspond to 10 ON states at 100% reflectivity, the Green segment would correspond to 1.25 ON states at 100% reflectivity, the White segment would correspond to 11.25 ON states at 100% reflectivity, and the Blue segment would correspond to 8.5 ON states at 100% reflectivity. It can be seen in this example that finer steps in perceived luminance can again be achieved, thus increasing bit depth. Other numbers of ON/OFF states and other reflectivity levels can be used to obtain corresponding results in accordance with the guidance of the embodiments.

For another embodiment, assume an embodiment of a viewing surface having a dynamic range of four, i.e., the viewing surface has a lowest achievable reflectivity that is 25% of its highest achievable reflectivity. The highest achievable reflectivity can be normalized to be 1.0 units, which means the lowest achievable reflectivity is 0.25 units. Assume the viewing surface is controlled with 2 bits. For example, control bits 00 could correspond to 0.25 units of normalized viewing surface reflectivity, control bits 01 could correspond to 0.50 units, control bits 10 could correspond to 0.75 units and control bits 11 could correspond to 1.0 units.

For such an embodiment, further assume a projector having its output controlled by 5 bits, thus providing 32 discrete levels of projected intensity, e.g., from 0 to 31 possible ON states. To produce the highest luminance available within such a projection system, projector light intensity output (referred to as projector output) and viewing surface reflectivity would both be set to the highest achievable level. To produce decreasing values of reflected luminance, the projector (the device with the highest dynamic range in this example) can reduce its output. For one embodiment, projector output is reduced until the desired reflected luminance can be reproduced using a projector output of less than or equal to its highest achievable output while reducing the viewing surface reflectivity to its next lower level of reflectivity. Continuing reductions in reflected luminance can further be obtained by reducing the projector output from its highest achievable value until the desired reflected luminance once again can be reproduced using a projector output of less than or equal to its highest achievable output while reducing the viewing surface reflectivity to its next lower level of reflectivity. This methodology can be repeated until the viewing surface has its lowest level of reflectivity and the projector has its lowest level of output. Table 1 details the relative luminance values that can be obtained using a projection system of the described embodiment.

TABLE 1

| Index | Projector Output (ON-states per sub-frame) | Viewing surface Reflectance (% of max reflectance) | Image Luminance (% of max) |
|---|---|---|---|
| 1 | 31 | 100 | 100.00 |
| 2 | 30 | 100 | 96.77 |
| 3 | 29 | 100 | 93.55 |
| 4 | 28 | 100 | 90.32 |
| 5 | 27 | 100 | 87.10 |
| 6 | 26 | 100 | 83.87 |
| 7 | 25 | 100 | 80.65 |
| 8 | 24 | 100 | 77.42 |
| 9 | 31 | 75 | 75.00 |
| 10 | 30 | 75 | 72.58 |
| 11 | 29 | 75 | 70.16 |
| 12 | 28 | 75 | 67.74 |
| 13 | 27 | 75 | 65.32 |
| 14 | 26 | 75 | 62.90 |
| 15 | 25 | 75 | 60.48 |
| 16 | 24 | 75 | 58.06 |
| 17 | 23 | 75 | 55.65 |
| 18 | 22 | 75 | 53.23 |
| 19 | 21 | 75 | 50.81 |
| 20 | 31 | 50 | 50.00 |
| 21 | 30 | 50 | 48.39 |
| 22 | 29 | 50 | 46.77 |
| 23 | 28 | 50 | 45.16 |
| 24 | 27 | 50 | 43.55 |
| 25 | 26 | 50 | 41.94 |
| 26 | 25 | 50 | 40.32 |
| 27 | 24 | 50 | 38.71 |
| 28 | 23 | 50 | 37.10 |
| 29 | 22 | 50 | 35.48 |
| 30 | 21 | 50 | 33.87 |
| 31 | 20 | 50 | 32.26 |
| 32 | 19 | 50 | 30.65 |
| 33 | 18 | 50 | 29.03 |
| 34 | 17 | 50 | 27.42 |
| 35 | 16 | 50 | 25.81 |
| 36 | 31 | 25 | 25.00 |
| 37 | 30 | 25 | 24.19 |
| 38 | 29 | 25 | 23.39 |
| 39 | 28 | 25 | 22.58 |
| 40 | 27 | 25 | 21.77 |
| 41 | 26 | 25 | 20.97 |

TABLE 1-continued

| Index | Projector Output (ON-states per sub-frame) | Viewing surface Reflectance (% of max reflectance) | Image Luminance (% of max) |
|---|---|---|---|
| 42 | 25 | 25 | 20.16 |
| 43 | 24 | 25 | 19.35 |
| 44 | 23 | 25 | 18.55 |
| 45 | 22 | 25 | 17.74 |
| 46 | 21 | 25 | 16.94 |
| 47 | 20 | 25 | 16.13 |
| 48 | 19 | 25 | 15.32 |
| 49 | 18 | 25 | 14.52 |
| 50 | 17 | 25 | 13.71 |
| 51 | 16 | 25 | 12.90 |
| 52 | 15 | 25 | 12.10 |
| 53 | 14 | 25 | 11.29 |
| 54 | 13 | 25 | 10.48 |
| 55 | 12 | 25 | 9.68 |
| 56 | 11 | 25 | 8.87 |
| 57 | 10 | 25 | 8.06 |
| 58 | 9 | 25 | 7.26 |
| 59 | 8 | 25 | 6.45 |
| 60 | 7 | 25 | 5.65 |
| 61 | 6 | 25 | 4.84 |
| 62 | 5 | 25 | 4.03 |
| 63 | 4 | 25 | 3.23 |
| 64 | 3 | 25 | 2.42 |
| 65 | 2 | 25 | 1.61 |
| 66 | 1 | 25 | 0.81 |
| 67 | 0 | 25 | 0.00 |

In the example of Table 1, it can be seen that while the projector has 5 bits of output light intensity modulation capability, or 32 distinct levels of output, a significantly greater dynamic range can be achieved by coordinating its output with the modulation capabilities of the viewing surface. For the example shown, 67 distinct output states, equivalent to more than 6 control bits, are obtained by using the lowest level of viewing surface reflectivity compatible with producing the desired reflected luminance. In other words, the effective bit depth of the projector is increased without modification of the projector. It is noted that additional or intermediate values of relative luminance could be obtained, such as a 74.19% relative luminance value using 23 ON states of the projector and a viewing surface reflectivity of 100% of its highest achievable value and other such combinations. However, to reduce the deleterious effects of ambient light, it is generally desirable to use the lowest level of viewing surface reflectivity that can reproduce the desired image. Thus, while the system may be capable of more accurately providing the desired relative luminance value, it may be desirable to forego use of these intermediate values of relative luminance in order to mitigate the effects of ambient lighting. It is further noted that, as can be seen from Table 1, the luminance steps of the system are not all equal. However, image processing units may be configured to utilize modified transfer functions having uneven steps.

Figure 5A:
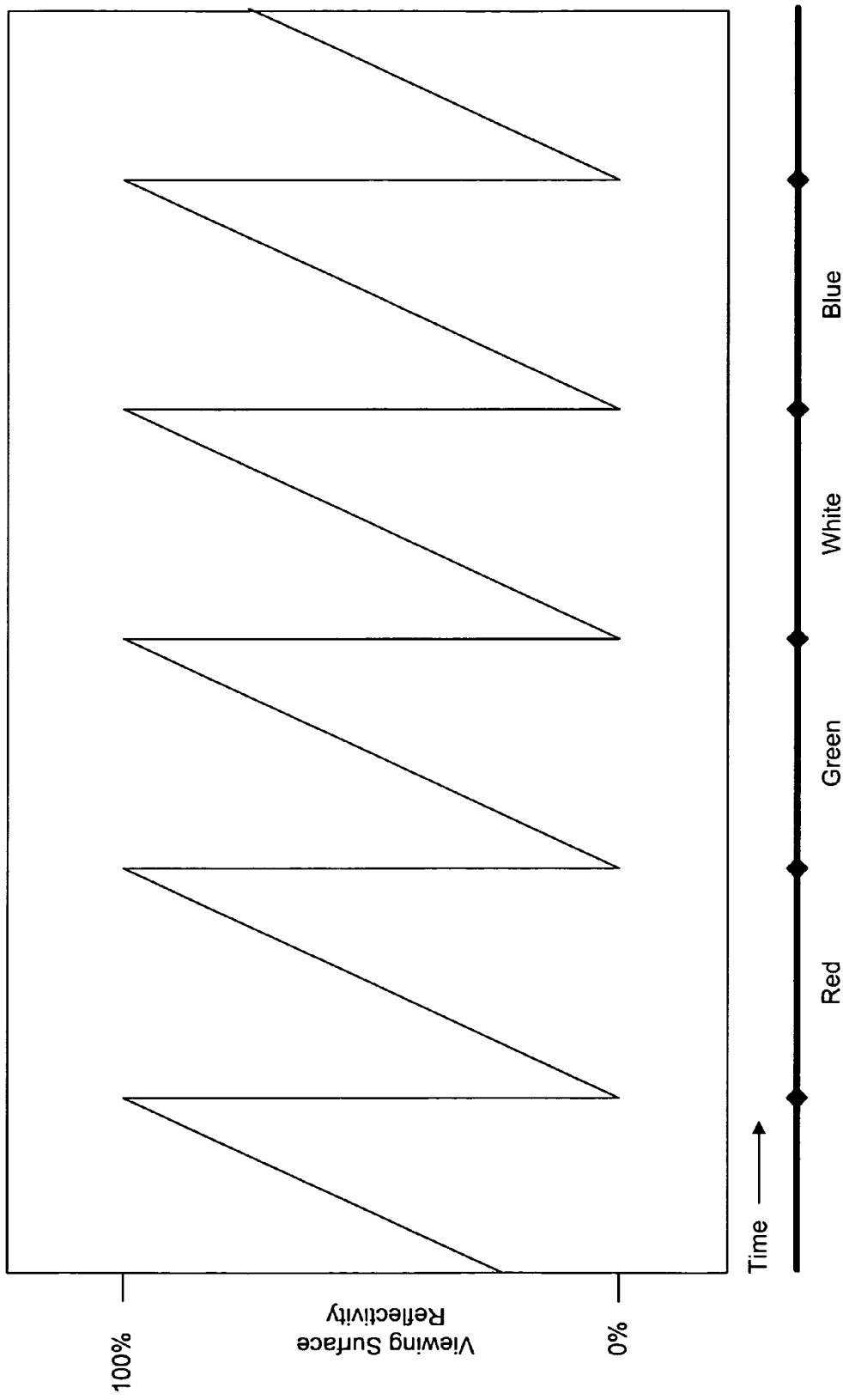
FIGS. 5A-5B are graphs depicting reflectivity of an embodiment of a viewing surface in relation to sequentially projected color sub-fields in accordance with further embodiments of the disclosure.
Figure 5B:
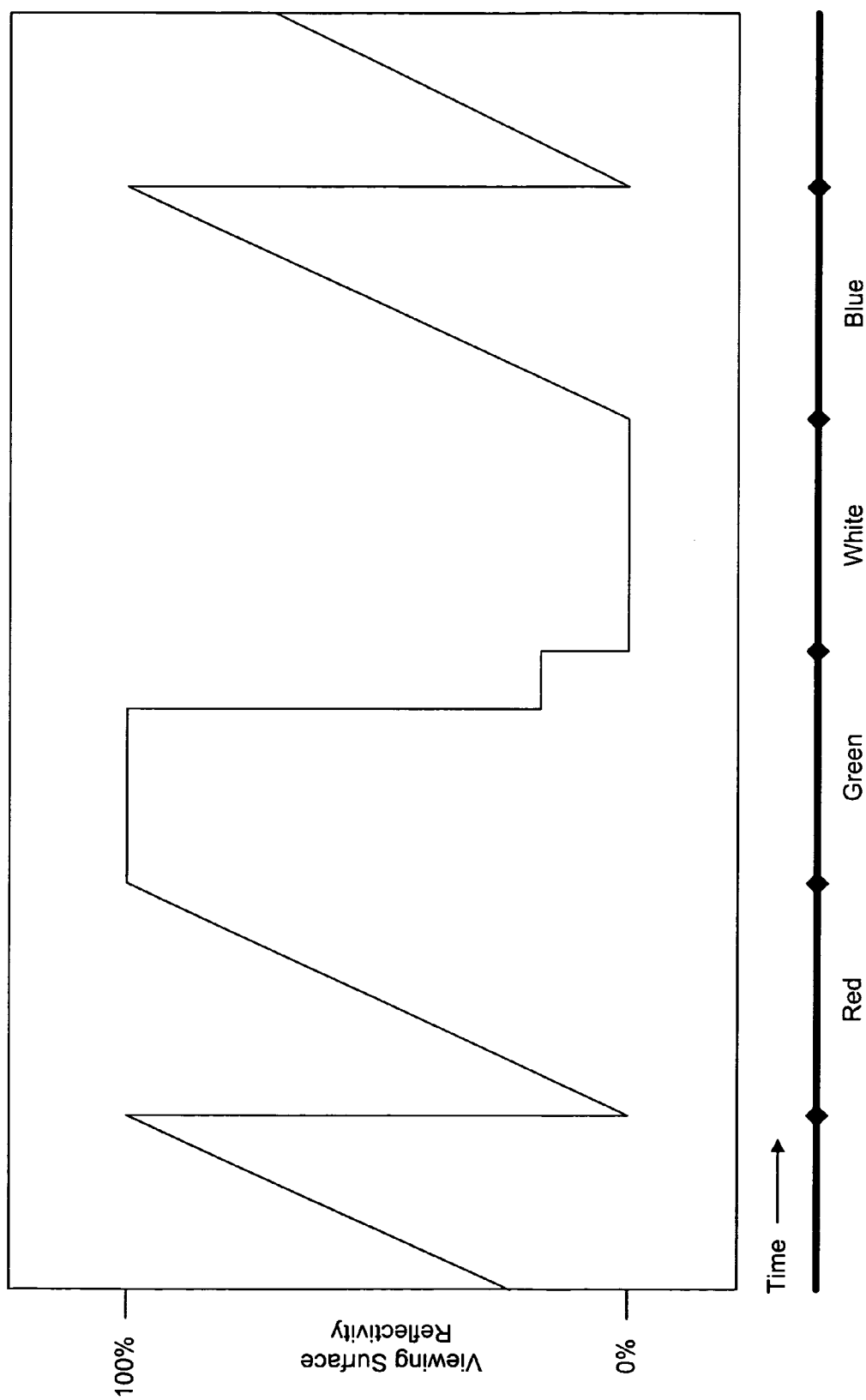

In the foregoing example, the projector was assumed to be idealized, i.e., to have no projected light at its lowest projected output. In practice, light commonly leaks out of a projector, and the ratio of highest achievable output to lowest achievable output is the contrast ratio of the projector or its dynamic range. Coordinating the light modulation with a viewing surface capable of changing its reflectivity, the lowest achievable image luminance can be 25% of what it would be with a viewing surface of fixed reflectivity, thereby increasing the dynamic range of the system by a factor of four regardless of whether leakage of light occurs FIGS. 5A-5B are graphs depicting the reflectivity, over time, of an embodiment of a viewing surface in relation to sequentially projected color sub-fields in accordance with various embodiments of the disclosure. Although the embodiments described with reference to FIGS. 3A, 3B and 4 depict the reflectivity of an element as being substantially constant throughout a desired time period, this need not be the case. The reflectivity can skew or ramp from one reflectivity level to another, with the image processing unit anticipating the changes in reflectivity to provide a projected intensity to produce the desired reflected luminance as described herein.

FIG. 5A is a graph depicting the reflectivity of a viewing surface in relation to color sub-fields in accordance with one embodiment of the disclosure. By slewing the reflectivity during each color sub-field, a reduced average reflectivity, such as a 50% reflectivity, may be produced. In addition, light projected during the portions of the sub-field when the screen reflectivity is very low results in very dim spots that are more difficult to see than spots produced on a screen with fixed reflectivity. If the projected image intensity is taken into account and controlled in coordination with the changing screen reflectivity, the precision with which the system can change the luminance of the output image is increased, thereby increasing the bit-depth of the display system, i.e., increasing the number of bits effectively defining the luminance of the output image. For example, if 8 bits are used to define the output power of the light engine, there might be 256 discrete levels of output power and, therefore, luminance of the output image if a reflectivity of the screen is constant or substantially constant. If a desired relative luminance is, for example, between 0% and 50% of its greatest value, there might be 128 discrete levels of output power defining the luminance of the output image if a reflectivity of the screen is maintained at its greatest value. However, by reducing the reflectivity of the screen to 50% of its greatest value, the full bit depth of the light engine could be used to result in 256 discrete levels of reflected relative luminance between the values of 0% to 50%. In FIG. 5B it is shown that any number of variations may be used to produce a desired response. In each of these examples, the intensity of the projected image is adjusted to take into account the screen reflectivity at the time when the light is projected to achieve greater contrast.

Figure 6:
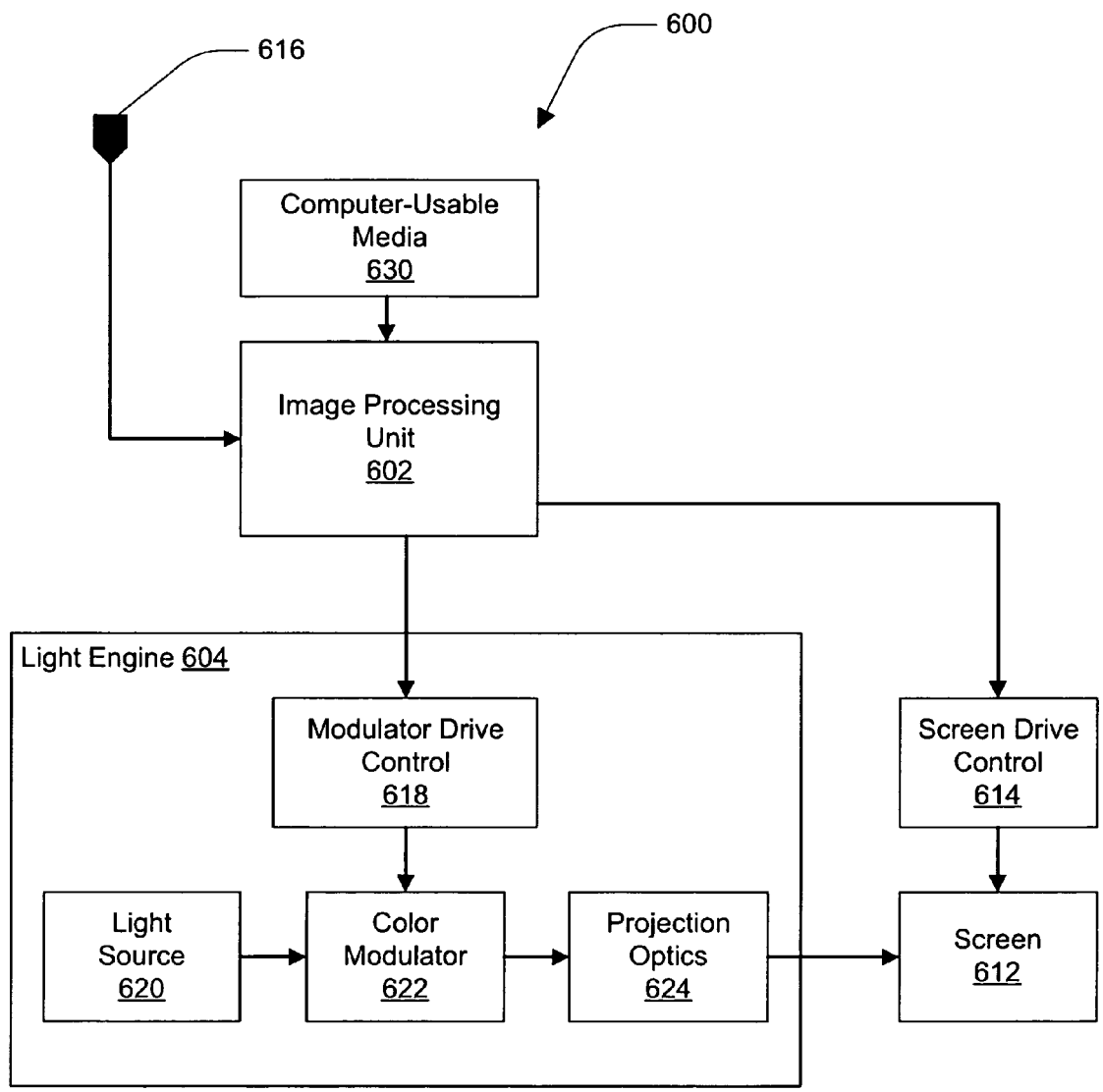
FIG. 6 is a schematic of an embodiment of an image processing unit in accordance with another embodiment of the disclosure.

FIG. 6 is a schematic of an embodiment of a projection system 600 in accordance with a further embodiment of the present disclosure. Projection system 600 may include a light engine 604 having a light source or illumination source 620 configured to direct light along an optical path or light path toward screen 612. Light source 620 may be any suitable device configured to generate light that can be directed toward screen 612. For example, light source 620 may be a single light source, such as a mercury lamp or other broad-spectrum light source. Alternatively, light source 620 may include multiple light sources, such as light emitting diodes (LEDs), lasers, etc.

Light generated from light source 620 further may be directed onto a color modulator 622. Color modulator 622 may include a spatial light modulator, such as a micromirror array, a color filter and/or a multi-colored light source. The color modulator may also encompass a mirror modulator with a separate spinning color filter filtering the light from light source 620. Alternatively the color modulator may be LCD shutter with an integrated color filter. The color modulator 622 generates colored rays of light for projection on the screen 612 as spots of light. The color modulator 622 controls the average hue, colorfulness and brightness for the light spot for a given frame period or sub-field.

For some embodiments, the color modulator 622 is integral with the light source 620, which may be the case with LEDs or multiple narrow spectrum light sources. Alternatively, the color modulator 622 may be independent of the light source 620. Regardless of the configuration, the combination of a light source and a color modulator produces the color light array for projection of the output image. Thus, while the depiction of the light engine 604 of FIG. 6 shows the color modulator 622 separate from the light source 620, the embodiments are not limited to any particular technology for producing spatially-modulated colored rays of light and the combined functionality may be present within a single device or multiple devices.

Projection system 600 may further include a modulator drive control 618 configured to manage generation of the projected image from the light engine 604 in response to control signals from the image processing unit 602. Light emitted from the light source 620 is modulated by color modulator 622, as directed by modulator drive control 618, and passed through projection optics 624 onto screen 612. Projection optics 624 may include one or more projection lenses. Typically, projection optics 624 are adapted to focus, size, and position the output image on screen 612.

In operation, image data 616 for a desired image is received by the image processing unit 602. The image processing unit 602 generates control signals for use by the light engine 604 and screen drive control 614 such that the light engine 604 will be directed to project the spots of light having the appropriate hue, colorfulness and brightness and the modulated screen 612 will be directed to correspondingly modulate its elements to the desired reflectivity to approximate the desired output image on the screen 612. The screen 612 provides an ON or OFF state on a per element basis. When a given element is ON, then the surface of the associated element is reflective, as explained previously in the case of a front-projection system, or transmissive, as explained previously in the case of a rear-projection system. When a given element is OFF, then the surface of the associated element is black or non-reflective as explained previously, in the case of a front-projection system, or opaque or non-transmissive as explained previously, in the case of a rear-projection system. As noted previously, the elements of screen 612 may further assume states, i.e., levels of reflectivity or transmissivity, between their ON and OFF states and the control circuit would generate control signals specifying the desired level of reflectivity or transmissivity. Similarly, the reflectivity or transmissivity can vary for each spectral range.

While the various functionality of the projection system 600 is depicted as corresponding to discrete control entities, it is recognized that much of the functionality can be combined in a typical electronic circuit or even an application-specific integrated circuit chip in various embodiments. For example, the functionality of the image processing unit 602 and the screen drive control 614 could be contained within the light engine 604, with the light engine 604 directly receiving the image data 616 and providing a control output to the screen 612. Alternatively, the screen drive control 614 could be a component of the screen 612. In addition, the screen 612 could include its own image processing unit responsive to image data 616 such that the screen 612 and the light engine 604 could independently respond to the image data 616. Furthermore, the control signals for the screen drive control 614 may not be provided through a control output. For example, control signals could be provided to screen drive control 614 through some form of wireless communication, such as infra-red (IR) or radio frequency communication.

It is noted that the image processing unit 602 may be adapted to perform the methods in accordance with the various embodiments in response to computer-readable instructions. These computer-readable instructions may be stored on a computer-usable media 630 and may be in the form of either software, firmware or hardware. In a hardware solution, the instructions are hard coded as part of a processor, e.g., an application-specific integrated circuit chip. In a software or firmware solution, the instructions are stored for retrieval by the processor. Some additional examples of computer-usable media include read-only memory (ROM), electrically-erasable programmable ROM (EEPROM), flash memory, magnetic media and optical media, whether permanent or removable.

What is claimed is:

1. An apparatus, comprising:
   a light engine to project light onto elements capable of changing states; and
   a processing unit configured to cause the light engine to adjust a level of intensity of the light projected in response to expected states for the elements and in response to a desired luminance of an image to permit a number of levels of luminance of light from the elements greater than a number of the levels of the intensity of the light capable of projection by the light engine, the processing unit configured to adjust the level of the intensity of the light projected during a first portion of a first time period according to expected states for the elements during the first portion of the first time period and to adjust the level of the intensity of the light projected during a second portion of the first time period according to expected states for the elements during the second portion of the first time period, the expected states for the elements during the first portion of the first time period are different than the expected states for the elements during the second portion of the first time period.

2. The apparatus of claim 1, wherein each time period corresponds to a color sub-field of the light engine.

3. The apparatus of claim 2, wherein the states of the elements during the second portion of the first time period are maintained for a first portion of a subsequent time period, wherein the states of the elements during a second portion of the subsequent time period are the same as during the first portion of the first time period and wherein the desired luminance includes a desired relative luminance.

4. The apparatus of claim 1, wherein the processing unit is configured to adjust the states of the elements in response to a desired luminance of pixels of an output image.

5. The apparatus of claim 4, wherein the processing unit is configured to vary an average reflectivity or transmissivity of the elements inversely with changes in a desired luminance of pixels of an output image.

6. The apparatus of claim 4, wherein the elements are addressable to individually control their states.

7. The apparatus of claim 4, wherein the processing unit is configured to cause the elements to change between ON states and OFF states.

8. The apparatus of claim 7, wherein the processing unit is configured to cause the elements to vary their states to include additional states between the ON states and OFF states and wherein the ON states and OFF states for a first spectral range are different than the ON states and OFF states for a second spectral range.

9. The apparatus of claim 1, wherein the states of the elements are states of reflectivity or states of transmissivity.

10. The apparatus of claim 1, wherein the states of the elements are changeable on a scene-by-scene basis, a frameby-frame basis, or a color sub-field-by-color sub-field basis, or changeable within a time interval of a color sub-field.

11. The apparatus of claim 10, wherein the processing unit is adapted to anticipate changes in the states of the elements and provide a level of intensity of projected light to produce the desired luminance of the output image in coordination with the changing states of the elements.

12. The apparatus of claim 1, wherein the states of the elements are a function of input image data.

13. The apparatus of claim 12, wherein the input image data is representative of a desired luminance of an output image.

14. The apparatus of claim 13, wherein the input image data is further representative of at least one of user input and viewing conditions.

15. A method, comprising:
projecting light onto elements capable of changing states; and
adjusting the states of the elements based on a desired luminance of an image corresponding to the elements;
adjusting a level of intensity of the light based on both the desired luminance of the image corresponding to the elements and an expected state of the elements, the expected states for the elements being a function of the desired luminance of the image corresponding to the elements to facilitate a number of levels of luminance from the elements greater than a number of levels of the intensity of the light projected; and
adjusting the level of the intensity of the light during a first portion of a time period according to expected states for the elements during the first portion of the time period and adjusting the level of the intensity of the light during a second portion of the time period according to expected states for the elements during the second portion of the time period, the expected states for the elements during the first portion of the time period are different than the expected states for the elements during the second portion of the time period.

16. The method of claim 15, wherein each time period corresponds to a color sub-field of the light engine.

17. The method of claim 15, wherein changing states of the elements further comprises changing a reflectivity or transmissivity of the elements independently for more than one spectral range.

18. A method, comprising:
determining a level of desired luminance for a portion of an image for a first time period;
adjusting states of one or more screen elements corresponding to the portion of the image during the first time period;
projecting light onto the one or more screen elements during the first time period; and
adjusting an intensity of the light in response to expected states of the one or more screen elements during the first time period; and
adjusting states of the one or more screen elements corresponding to the portion of the image during a second time period, the states of the one or more screen elements adjusted to have a first value at a beginning of the first time period and a second value at an end of the first time period, and the states of the one or more screen elements adjusted to have the second value at a beginning of the second time period.

19. The method of claim 18, wherein adjusting states of the one or more screen elements corresponding to the portion of the image during the first time period further comprises reducing a level of reflectivity or increasing a level of transmissivity of the one or more screen elements and wherein adjusting an intensity of the projected light in response to the expected states of the one or more screen elements during the first time period further comprises increasing the intensity of the projected light to produce the desired luminance for the portion of the output image during the first time period.

20. A computer-usable media having computer-readable instructions adapted to cause a processor to perform a method, the method comprising:
generating first control signals for changing states of elements of a surface according to image data; and
generating second control signals for adjusting a number of discrete spots of light projected during a time period based on data indicating the states for the elements, the second control signals generated according to expected states for the elements during the first portion of the time period, the second control signals for adjusting the number of discrete spots of light projected during a second portion of the time period generated according to expected states for the elements during the second portion of the time period, the expected states for the elements during the first portion of the time period being different than the expected states for the elements during the second portion of the time period.

21. The computer-usable media of claim 20, wherein each time period corresponds to a color sub-field of the light engine.

22. The computer-usable media of claim 20, wherein generating first control signals for changing states of the elements further comprises generating the first control signals for changing a reflectivity or transmissivity of the elements independently for more than one spectral range.

* * * * *